Figure 1:
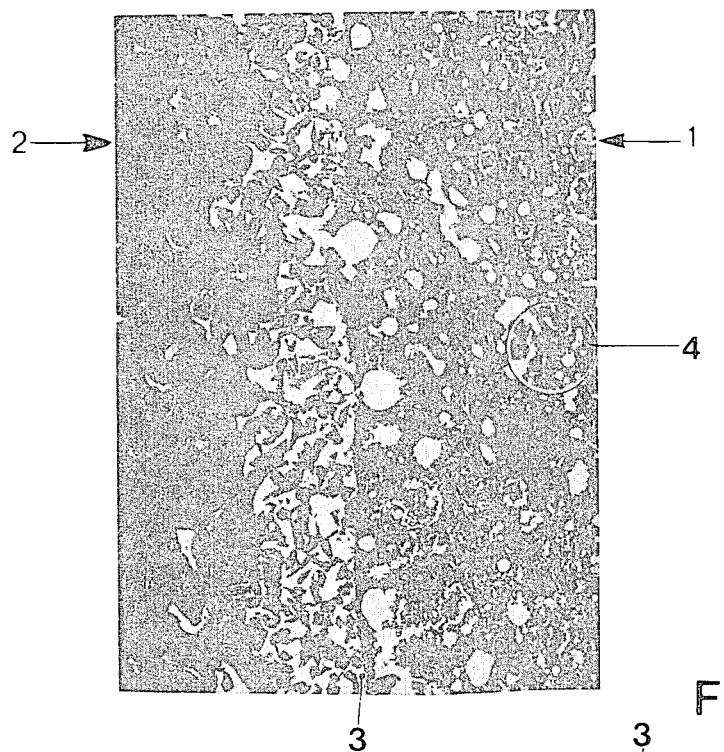

United States Patent [19]

Rhodes et al.

[11] 4,232,094
[45] Nov. 4, 1980

[54] SPRAYED COATINGS ON METAL SURFACES

[75] Inventors: Cyril E. Rhodes, Zeist; Martin B. Verburgh, Amersfoort, both of Netherlands

[73] Assignee: SKF Industrial Trading and Development Company B.V., Nieuwegein, Netherlands

[21] Appl. No.: 423,646

[22] Filed: Dec. 10, 1973

[30] Foreign Application Priority Data

Dec. 12, 1972 [NL] Netherlands ............... 7216832

[51] Int. Cl.$^2$ ............... B21F 27/02; B05D 3/06
[52] U.S. Cl. ............... 428/614; 148/14; 148/39; 427/35; 427/294; 427/295; 427/383.5; 427/376.6; 427/376.7; 427/376.8; 427/383.3; 427/427; 428/615; 428/617; 428/627; 428/632; 428/679; 428/932; 428/937; 428/939
[58] Field of Search ............... 117/62, 93.3, 93.1 PF; 427/383, 421, 427, 372, 376 H, 376 E, 376 G, 35, 383 A, 383 C, 422, 294, 295; 428/614, 615, 932, 617, 937, 632, 939; 148/14, 39

[56] References Cited

U.S. PATENT DOCUMENTS

| 1,864,590 | 6/1932 | Fifield | 427/376 H |
|---|---|---|---|
| 3,053,689 | 9/1962 | Shoudy et al. | 427/376 H |
| 3,059,325 | 10/1962 | Taylor et al. | 427/376 H |
| 3,361,562 | 1/1968 | Ulrich et al. | 427/376 H |
| 3,539,192 | 11/1970 | Prasse | 117/93.1 PF |
| 3,642,519 | 2/1972 | Tiner et al. | 117/93.1 PF |
| 3,758,124 | 9/1973 | Weinberger et al. | 117/93.1 PF |
| 3,821,019 | 6/1974 | Michael | 117/93.1 PF |

FOREIGN PATENT DOCUMENTS

| 698455 | 11/1964 | Canada | 427/376 H |
|---|---|---|---|
| 880311 | 6/1953 | Fed. Rep. of Germany | 117/93.3 |

OTHER PUBLICATIONS

Thun, R. E., *On Some Aspects of Electron Beam Evaporations*, in Proceedings of 2nd Symposium on Electron Beam Processes, Mar. 24 & 25, 1960, Boston, p. 89.

*Primary Examiner*—Ronald H. Smith
*Assistant Examiner*—Janyce A. Bell
*Attorney, Agent, or Firm*—Daniel M. Rosen

[57] ABSTRACT

Process of improving a sprayed layer on a bearing or tool component subjected to relatively high stresses, characterized in that the layer is remelted by a heat-source in a vacuum chamber, the heating being arranged such that only the layer itself is remelted.

10 Claims, 2 Drawing Figures

SPRAYED COATINGS ON METAL SURFACES

The invention refers to a process for improving a sprayed layer on bearing- and tool components which are subjected to high stresses in service.

It is known that such layers are applied by flame- or plasma-spraying powder materials for imparting improved wear, corrosion or heat resisting properties to the component (U.S. Pat. No. 3,642,519). However, these coatings are unsuitable for such components as rolling bearing rings or metal-cutting tools due to the weak adhesion of the coatings to the metal substrate and to the porosity or oxide content of the layer itself.

It is also known to improve such layers by a fusing treatment after spraying using specially formulated powder materials (British Pat. No. 867455). However, the resultant coatings are still unsuitable for highly stressed components.

The present invention aims at eliminating such limitations and is characterized in that the layer, which had been applied to a component, as described previously, is remelted by a heat source in a vacuum-chamber whereby the heating is so arranged that only the layer itself is remelted. It has been found that such procedure provides an improved bonding between the layer and the component. Further more this new process reduces the porosity and improves the structure of the layer but does not affect the properties of the component-material.

A preferred process according to the invention is characterised in that the remelting of the layer is effected by means of an electron-beam in a vacuum chamber using, for example, an electron beam welding apparatus. Such an arrangement ensures a relatively simple, safe and reliable process in accordance with the invention.

For the sake of completeness it has to be pointed out that the electron-beam machine suitable for carrying out the said process is of the type wherein an electron beam is focussed by means of an electro-magnetic lens onto narrowly limited points of a workpiece or component permitting thereby the establishment of high temperatures, which are required for welding, adhesion and hardening, respectively. Through the electro-magnetic deflection of the electron beam it is possible to expose the component to various heating and welding conditions. Other heat sources can be used as well, provided their action is not influenced by being applied under vacuum.

It is advantageous to carry out the process according to the invention in a vacuum chamber, wherein a pressure of about $10^{-1}$ torr or less has been established.

Under such conditions porosity and oxide content decreased considerably and a finer and more uniform distribution of, for example carbides, and a higher density can be obtained, such as was ascertained.

Satisfactory results can be obtained with a layer, consisting of essentially a metal alloy or an alloy of about 50 percent ceramic material such as, for example tungsten carbide in a nickel-cobalt matrix. The microscopic analysis of such element, obtained in accordance with the invention produces distinctly a fine, uniform structure of the layer, which differs from that of the layers applied to a component by the known methods.

Figure 2:
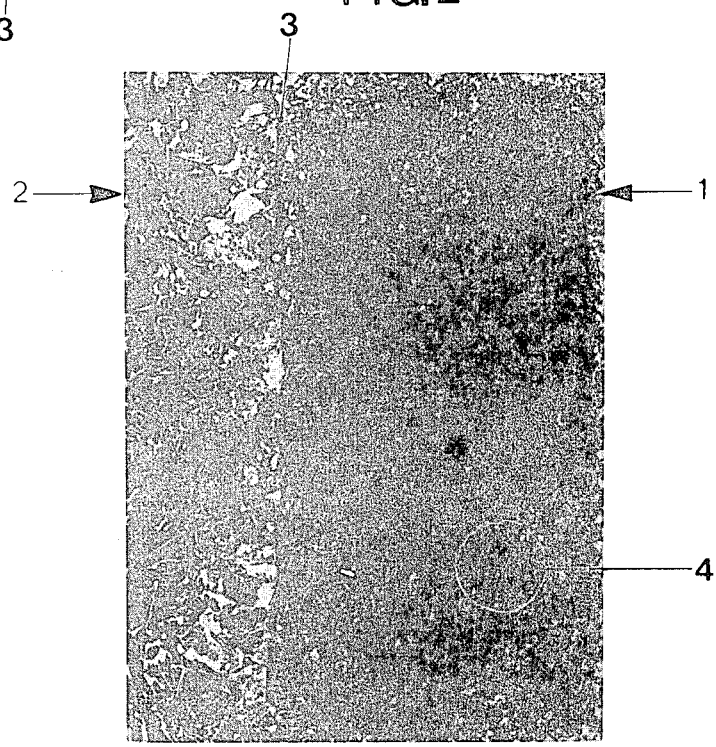

Such structural differences are clearly visible in the FIGS. 1 and 2, representing prints of microscopic photographs.

FIG. 1 is a cross-section through a layer 1 and the basic material 2. The layer 1, composed of a carbide-cobalt-nickel alloy, has been applied in this case by flame spraying to the basic material. The figure shows clearly the relatively wide borderline 3 of diffusion between the layer 1 and the basic material 2. The uneven distribution of the carbides 4 in the layer, as well as its size (porosity) are remarkable as well.

FIG. 2 represents a cross-section of an improved layer which has been remelted by means of an electron beam in vacuum according to the invention. The composition of the improved layer and that of the basic material are identical with those as shown in FIG. 1. FIG. 2 represents clearly the increased density and the finer and more evenly distribution of carbides 4, as well as the higher degree of diffusion of the layer 1 towards the basic material 2, indicating an optimum bonding between the layer and the basic material.

In this manner the present invention provides a stronger and better bonded layer which particularly is suitable as a layer for bearing-ring-tracks or as a wear resistant layer for cutting tools. It is also an embodiment of the process that improved coatings according to the invention can be applied to a cheap steel base and thus replace expensive bearing and tool steels.

We claim:

1. A method of producing an improved layer bonding in a bearing tool component subjected to relatively high stresses and comprising a sprayed exterior coating layer on a base member, said method comprising the steps of: spraying said exterior coating layer on said base member; and applying heat directly only to said exterior coating layer in an amount sufficient for remelting only said layer, in a chamber evacuated to a pressure of $10^{-1}$ torr or less, so that the properties of said base member remain substantially unaltered and the bonding improved.

2. A method as in claim 1, wherein said remelting is executed with an electron beam, said beam being produced by an electron beam welding apparatus.

3. A method as in claim 1, wherein said layer consists of a metal alloy.

4. A method as in claim 1, wherein said layer consists of an alloy of ceramic material and metal.

5. A method as in claim 1, wherein said layer consists of metal and metal carbide.

6. A method as in claim 5, wherein said layer consists essentially of about 50% tungsten carbide distributed in a nickel-cobalt matrix.

7. A method as in claim 1, wherein said layer consists of an alloy containing oxide material.

8. A rolling bearing ring produced by the method defined in claim 1.

9. A cutting tool produced by the method defined in claim 1.

10. A method of producing improved layer bonding in a layer coated metallic base member component, comprising the steps of spraying a metallic base member compound with a continuous exterior coating layer of a relatively porous oxidic alloy, placing said sprayed base member component in a reduced pressure chamber of $10^{-1}$ torr or less, and heating said layer in said chamber with a heat source employing a focussed heat confined to limited points only on said layer without said base member component being affected, and with sufficient energy to effect only remelting of said layer to reduce the porosity and oxide content of said layer, the properties of said base member remaining substantially unaltered, and the bonding of said layer to said base member thereby being improved.

* * * * *